United States Patent
Wu et al.

(10) Patent No.: US 10,054,719 B2
(45) Date of Patent: Aug. 21, 2018

(54) METHODS FOR FARBRICATING DOUBLE-LENS STRUCTURES

(71) Applicant: VisEra Technologies Company Limited, Hsin-Chu (TW)

(72) Inventors: Han-Lin Wu, Hsin-Chu (TW); Yu-Kun Hsiao, Hsin-Chu (TW); Yueh-Ching Cheng, Hsinchu (TW)

(73) Assignee: VisEra Technologies Company Limited, Hsin-Chuy (TW)

( * ) Notice: Subject to any disclaimer, the term of this patent is extended or adjusted under 35 U.S.C. 154(b) by 0 days.

(21) Appl. No.: 15/292,575

(22) Filed: Oct. 13, 2016

(65) Prior Publication Data
US 2017/0031065 A1    Feb. 2, 2017

Related U.S. Application Data

(62) Division of application No. 14/448,484, filed on Jul. 31, 2014, now Pat. No. 9,513,411.

(51) Int. Cl.
*G02B 3/00* (2006.01)
*G02B 5/20* (2006.01)
*C09K 13/00* (2006.01)

(52) U.S. Cl.
CPC ......... *G02B 3/0068* (2013.01); *G02B 3/0012* (2013.01); *G02B 5/201* (2013.01); *C09K 13/00* (2013.01)

(58) Field of Classification Search
CPC .... G02B 3/0012; G02B 3/0069; G02B 5/201; C09K 13/00
See application file for complete search history.

(56) References Cited

U.S. PATENT DOCUMENTS

| | | | |
|---|---|---|---|
| 8,743,265 B2 * | 6/2014 | Toumiya | ........... H01L 27/14605 348/294 |
| 2003/0168679 A1 | 9/2003 | Nakai et al. | |
| 2004/0080005 A1 | 4/2004 | Yamamoto | |

(Continued)

FOREIGN PATENT DOCUMENTS

| CN | 1763963 A | 4/2006 |
|---|---|---|
| CN | 103137638 A | 6/2013 |

(Continued)

OTHER PUBLICATIONS

Office Action dated Aug. 25, 2017 in JP Application No. 2014-225880 (11 pages).

(Continued)

*Primary Examiner* — Anita Karen Alanko
(74) *Attorney, Agent, or Firm* — Muncy, Geissler, Olds & Lowe, P.C.

(57) ABSTRACT

A double-lens structure and a method for fabricating the same are provided. The double-lens structure includes a first lens structure formed of a color filter layer having a first refractive index and a second lens structure formed of a micro-lens material layer having a second refractive index and disposed on the first lens structure. The first refractive index of the color filter layer is different from the second refractive index of the micro-lens material layer. An incident light enters the second lens structure and then passes through the first lens structure. Further, a method for fabricating the double-lens structure is also provided.

9 Claims, 13 Drawing Sheets

(56) References Cited

U.S. PATENT DOCUMENTS

| | | |
|---|---|---|
| 2006/0077268 A1 | 4/2006 | Yokozawa |
| 2009/0146237 A1 | 6/2009 | Yun |
| 2011/0018080 A1 | 1/2011 | Ootake |
| 2012/0242873 A1 | 9/2012 | Toumiya et al. |
| 2012/0267743 A1 | 10/2012 | Nakamura et al. |
| 2012/0268631 A1 | 10/2012 | Takase et al. |

FOREIGN PATENT DOCUMENTS

| | | | |
|---|---|---|---|
| CN | 103915455 A | | 7/2014 |
| CN | 103941313 A | | 7/2014 |
| JP | 2000-357786 | | 12/2000 |
| JP | 2003-209230 | | 7/2003 |
| JP | 2006190904 A | * | 7/2006 |
| JP | 2006190904 A | | 7/2006 |
| JP | 2009088450 A | | 4/2009 |
| JP | 2010002450 A | | 1/2010 |
| JP | 2012-204354 | | 10/2012 |
| JP | 2012204354 A | | 10/2012 |
| JP | 2012-227476 | | 11/2012 |

OTHER PUBLICATIONS

Taiwanese Office Action of its related TW application and its Search Report dated Nov. 23, 2015; pp. 1-7.
JP Office Action dated Apr. 4, 2016 from corresponding JP Appl. No. 2014-225880, 8 pp.
Chinese Office Action dated Aug. 3, 2016 in application No. 20140776372.3. pp. 1-6.

* cited by examiner

METHODS FOR FARBRICATING DOUBLE-LENS STRUCTURES

CROSS REFERENCE TO RELATED APPLICATIONS

This application is a Divisional application of U.S. patent application Ser. No. 14/448,484, filed on Jul. 31, 2014, the entirety of which is incorporated by reference herein.

BACKGROUND

Field of the Invention

The invention relates to a microlens array and more particularly to a microlens array having a double-lens structure for use in a solid-state image sensor, and a method for fabricating the same.

Description of the Related Art

Recently, solid-state imaging sensors have been developed and are widely used in various image-capturing apparatuses, for example video cameras, digital cameras, minicam adapted personal computers, minicam adapted mobile phones, and so forth. Image sensors absorb incident radiation of a particular wavelength, such as visible light, UV light, IR light, or the like and generate an electrical signal corresponding to the absorbed radiation. There are a number of different types of semiconductor-based image sensors, for example charge-coupled device (CCD) image sensors or complementary metal-oxide semiconductor (CMOS) image sensors.

A solid-state imaging sensor typically consists of an array of pixels containing photo-sensors. Each photo-sensor in one respective pixel produces an electrical signal corresponding to an incident light irradiating on the photo-sensor in the image sensor. Therefore, the magnitude of the electrical signal produced by each photo-sensor is proportional to the amount of the incident light irradiating on the photo-sensor.

A microlens array is usually disposed over the solid-state imaging sensor to refract incident radiation to the photo-sensors. However, a large amount of incident light is not directed onto the photo-sensors. The sensitivity of solid-state imaging sensors cannot be improved due to lost light.

BRIEF SUMMARY

According to embodiments of the disclosure, a double-lens structure and a method for fabricating the same are provided. The double-lens structure is disposed over a solid-state image sensor and used as a microlens array for the solid-state image sensor to improve the condensing efficiency of the microlens array. The sensitivity of the solid-state image sensor is thereby enhanced.

In some embodiments, a double-lens structure is provided. The double-lens structure includes a first lens structure formed of a color filter layer having a first refractive index. The double-lens structure further includes a second lens structure formed of a micro-lens material layer having a second refractive index and disposed on the first lens structure. An incident light enters the second lens structure and then passes through the first lens structure. The first refractive index of the color filter layer is different from the second refractive index of the micro-lens material layer.

In some embodiments, a method for fabricating a double-lens structure is provided. The method includes forming a color filter layer having a first refractive index on a substrate. The method also includes forming a first hard mask on the color filter layer, and the first hard mask has a convex profile. The method further includes etching the color filter layer by using the first hard mask to form a first lens structure having a first convex profile surface. In addition, the method includes forming a micro-lens material layer having a second refractive index on the first lens structure. The method also includes forming a second hard mask on the micro-lens material layer, and the second hard mask has a convex profile. The method further includes etching the micro-lens material layer by using the second hard mask to form a second lens structure having a second convex profile surface. The first refractive index of the color filter layer is greater than the second refractive index of the micro-lens material layer.

In some other embodiments, a method for fabricating a double-lens structure is provided. The method includes forming a partition material layer having a first refractive index on a substrate. The method also includes forming a first grid-shaped hard mask on the partition material layer. The method further includes etching the partition material layer by using the first grid-shaped hard mask to form a grid-shaped partition on the substrate. In addition, the method includes coating a color filter layer having a second refractive index in the grid-shaped partition to form a first lens structure having a first concave profile surface. The method also includes forming a micro-lens material layer having a third refractive index on the first lens structure. The method further includes forming a second hard mask on the micro-lens material layer, and the second hard mask has a convex profile. In addition, the method includes etching the micro-lens material layer by using the second hard mask to form a second lens structure having a first convex profile surface. The first refractive index of the partition material layer is lower than the second refractive index of the color filter layer. The second refractive index of the color filter layer is lower than the third refractive index of the micro-lens material layer.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The following description is of the contemplated mode of carrying out the disclosure. This description is made for the purpose of illustrating the general principles of the disclosure and should not be taken in a limiting sense. The scope of the disclosure is best determined by reference to the appended claims.

In some embodiments of the disclosure, a double-lens structure is used as a microlens array and disposed over a solid-state image sensor to improve the condensing efficiency of the microlens array. Therefore, the sensitivity of the solid-state image sensor is also enhanced.

Figure 1:
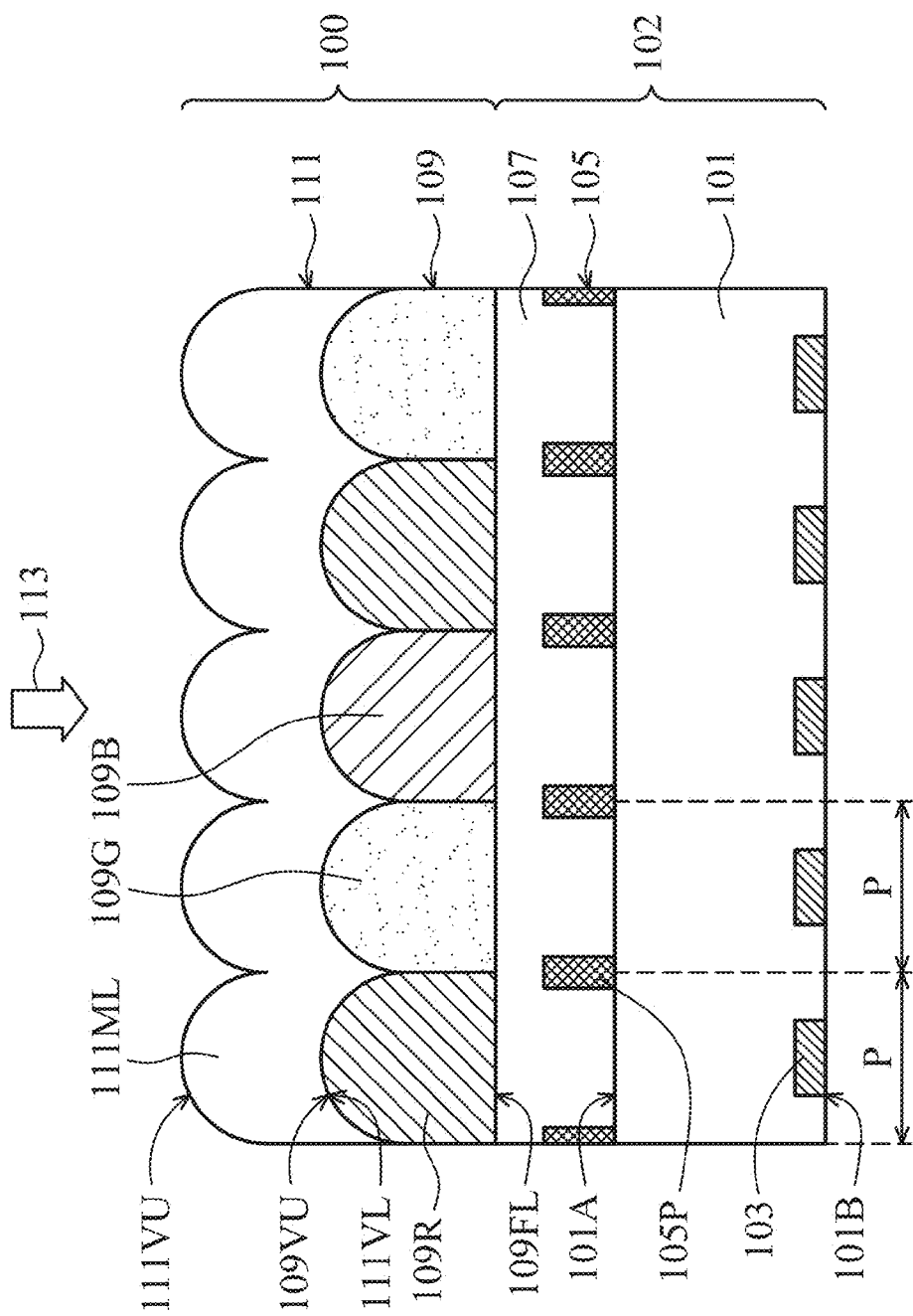
FIG. 1 shows a schematic cross section of a portion of a double-lens structure disposed over a solid-state image sensor according to some embodiments.

Referring to FIG. 1, a cross section of a portion of a double-lens structure 100 disposed over a solid-state image sensor 102 according to some embodiments is shown. The solid-state image sensor 102 includes a substrate 101, for example, a semiconductor substrate, having a front side surface 101A and a back side surface 101B. The semiconductor substrate may be a wafer or a chip. The solid-state image sensor 102 includes a plurality of photoelectric conversion elements 103, such as photodiodes, formed on the back side surface 101B of the substrate 101. Each of the photoelectric conversion elements 103 is disposed in one respective pixel P of the solid-state image sensor 102. The photoelectric conversion elements 103 are isolated from each other. Although FIG. 1 shows five pixels, actually the solid-state image sensor 102 has several million or more pixels.

A wiring layer (not shown) including various wiring lines and electronic circuits required for the solid-state image sensor 102 is formed on the front side surface 101A of the substrate 101. The solid-state image sensor 102 further includes a light-shielding layer 105 disposed over the front side surface 101A of the substrate 101. The light-shielding layer 105 has a plurality of light-shielding partitions 105P disposed between two adjacent pixels P. In addition, a passivation layer 107 is formed over the light-shielding layer 105 and has a substantially flat surface.

The double-lens structure 100 includes a first lens structure 109 formed on the passivation layer 107 and a second lens structure 111 formed on the first lens structure 109. The first lens structure 109 is formed of a color filter layer having a first refractive index $n_1$. In some embodiments, the color filter layer includes a plurality of color filter components, such as a red (R) color filter component 109R, a green (G) color filter component 109G and a blue (B) color filter component 109B. In some other embodiments, the color filter layer further includes a white (W) color filter component (not shown). These color filter components 109R, 109G and 109B are connected with each other. Each of the color filter components corresponds to one respective pixel P of the solid-state image sensor 102.

The second lens structure 111 is formed of a micro-lens material layer having a second refractive index $n_2$ different from the first refractive index $n_1$ of the color filter layer. The second lens structure 111 includes a plurality of microlens elements 111ML. Each of the microlens elements 111ML corresponds to one respective pixel P of the solid-state image sensor 102. The first lens structure 109 and the second lens structure 111 constitute a microlens array with a double-lens structure used for the solid-state image sensor 102.

In some embodiments, the first refractive index $n_1$ of the color filter layer is greater than the second refractive index $n_2$ of the micro-lens material layer. In the embodiments, the first lens structure 109 formed of the color filter layer has an upper convex profile surface 109VU for each of the color filter components 109R, 109G and 109B. The first lens structure 109 further has a lower flat surface 109FL opposite to the upper convex profile surface 109VU. The second lens structure 111 formed of the micro-lens material layer has an upper convex profile surface 111VU for each of the micro-lens elements 111ML. The second lens structure 111 further has a lower convex profile surface 111VL opposite to the upper convex profile surface 111VU. In addition, the lower convex profile surface 111VL of the second lens structure 111 is conformally formed on and in contact with the upper convex profile surface 109VU of the first lens structure 109.

An incident light 113 enters the second lens structure 111 from the upper convex profile surface 111VU and then passes through the first lens structure 109 to reach the photoelectric conversion elements 103. As shown in FIG. 1, in some embodiments, the double-lens structure 100 is formed on the front side surface 101A of the substrate 101. Therefore, the incident light 113 passes through the wiring layer (not shown) formed on the front side surface 101A and then reaches the photoelectric conversion elements 103 formed on the back side surface 101B of the substrate 101. In the embodiments, the solid-state image sensor 102 is referred to as a front-side illuminated (FSI) imaging sensor. In some other embodiments, the double-lens structure 100 is formed on the back side surface 101B of the substrate 101. Therefore, the incident light 113 reaches the photoelectric conversion elements 103 formed on the back side surface 101B without passing through the wiring layer (not shown) formed on the front side surface 101A of the substrate 101. In the embodiments, the solid-state image sensor 102 is referred to as a back-side illuminated (BSI) imaging sensor.

For both FSI and BSI imaging sensors, the incident light 113 is condensed by the double-lens structure 100 and then focused on the photoelectric conversion elements 103. Therefore, the sensitivities of the FSI and BSI imaging sensors are enhanced.

In the embodiments, the first refractive index $n_1$ of the first lens structure 109 is greater than the second refractive index $n_2$ of the second lens structure 111. In addition, the second lens structure 111 has an upper convex profile surface 111VU and the first lens structure 109 has an upper convex profile surface 109VU. According to the design of the profiles and the refractive indexes of the first lens structure 109 and the second lens structure 111, the condensing efficiency of the double-lens structure 100 is improved. The sensitivity of the solid-state image sensor 102 is thereby enhanced. Compared with a microlens array formed of a single-lens structure and disposed on a color filter layer having a flat surface, the condensing efficiency of the double-lens structure 100 of the embodiments is greatly enhanced.

Figure 2A:
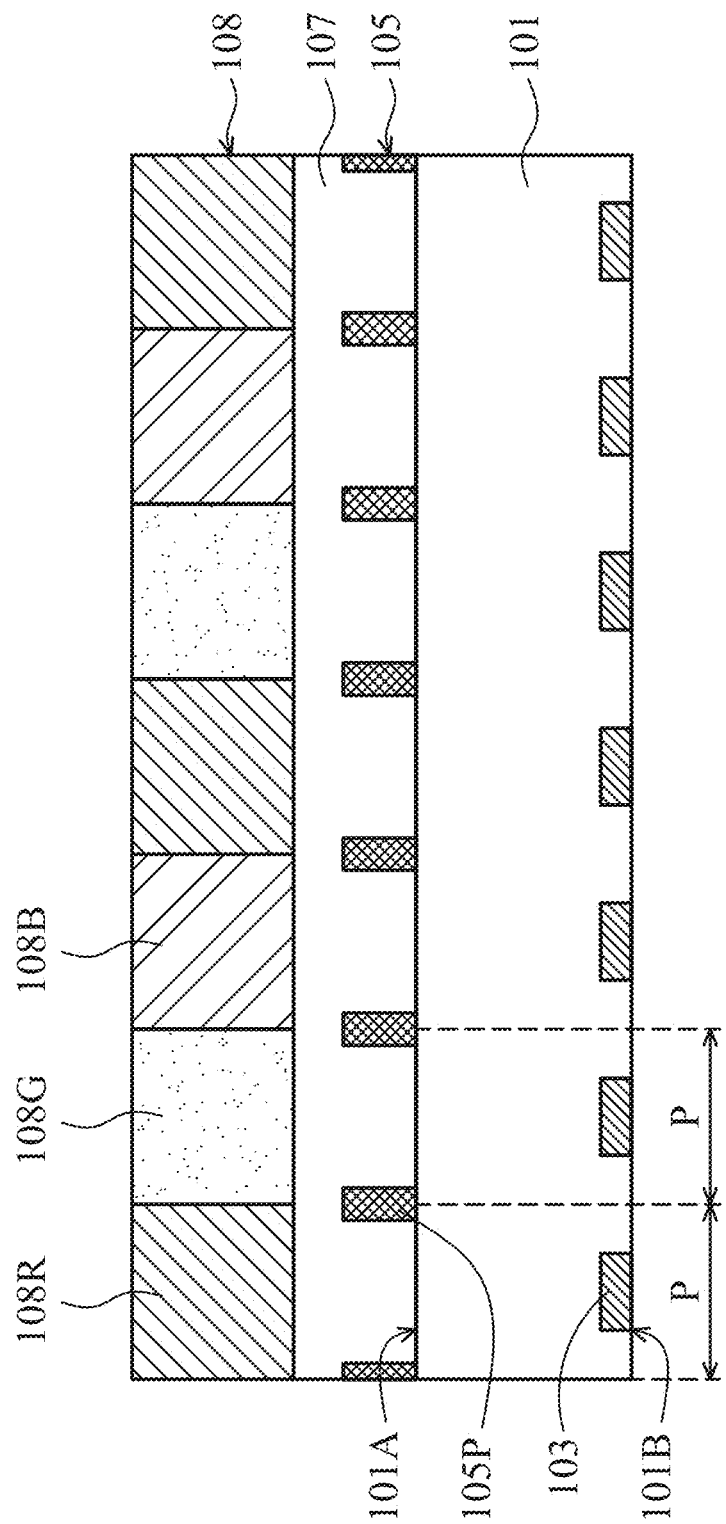
FIGS. 2A-2E show schematic partial cross sections of various stages of a process for fabricating the double-lens structure of FIG. 1 according to some embodiments.

FIGS. 2A-2E are partial cross sections of various stages of a process for fabricating the double-lens structure 100 of FIG. 1 in accordance with some embodiments. Referring to FIG. 2A, a substrate 101 having a plurality of photoelectric conversion elements 103, such as photodiodes, formed on the back side surface 101B of the substrate 101 is provided. In addition, a wiring layer (not shown) is formed on the front side surface 101A of the substrate 101. The photoelectric conversion elements 103 and the wiring layer are formed by a semiconductor fabrication technology. A light-shielding layer 105 is formed over the substrate 101. The light-shielding layer 105 includes a plurality of light-shielding partitions 105P disposed between two adjacent pixels P. In some embodiments, the light-shielding layer 105 is made of a black photoresist or a metal material. The light-shielding layer 105 is formed by an exposure and development process. In addition, a passivation layer 107 is formed over the substrate 101 to cover the light-shielding layer 105. The passivation layer 107 has a substantially flat surface. The material of the passivation layer 107 includes silicon oxide, silicon nitride, silicon oxynitride, or other suitable materials. The passivation layer 107 is formed by a deposition process or a coating process. Then, a solid-state image sensor 102 is completed.

A color filter layer 108 is formed on the passivation layer 107 of the solid-state image sensor 102. The color filter layer 108 has a first refractive index $n_1$. The color filter layer 108 includes a plurality of color filter components, such as a red (R) color filter component 108R, a green (G) color filter component 108G and a blue (B) color filter component 108B. The color filter components 108R, 108G and 108B are connected together and have a flat surface. The color filter components 108R, 108G and 108B are formed by a coating and a photolithography process at different steps in sequence.

Figure 2B:
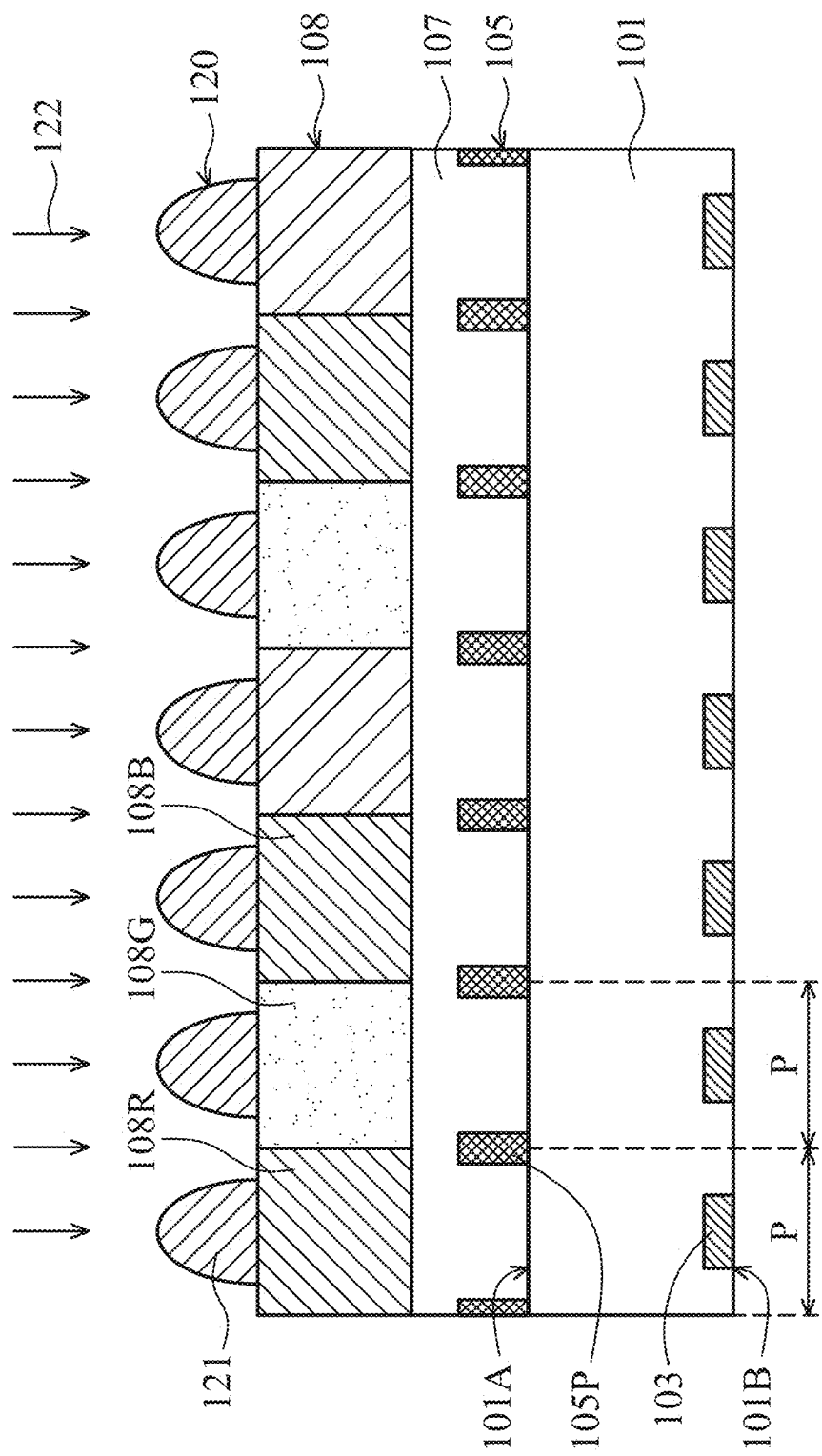

Referring to FIG. 2B, a first hard mask 120 is formed on the color filter layer 108. The first hard mask 120 has a plurality of elements 121. Each of the elements 121 has a convex profile and corresponds to one respective color filter component 108R, 108G or 108B. The material of the first hard mask 120 includes a transparent organic material. The first hard mask 120 is formed by a coating, photolithography and etching process. In some embodiments, the first hard mask 120 has a thickness smaller than that of the color filter layer 108. Each element 121 of the first hard mask 120 has an area smaller than that of each color filter component 108R, 108G or 108B. The elements 121 of the first hard mask 120 are separated from each other.

Figure 2C:
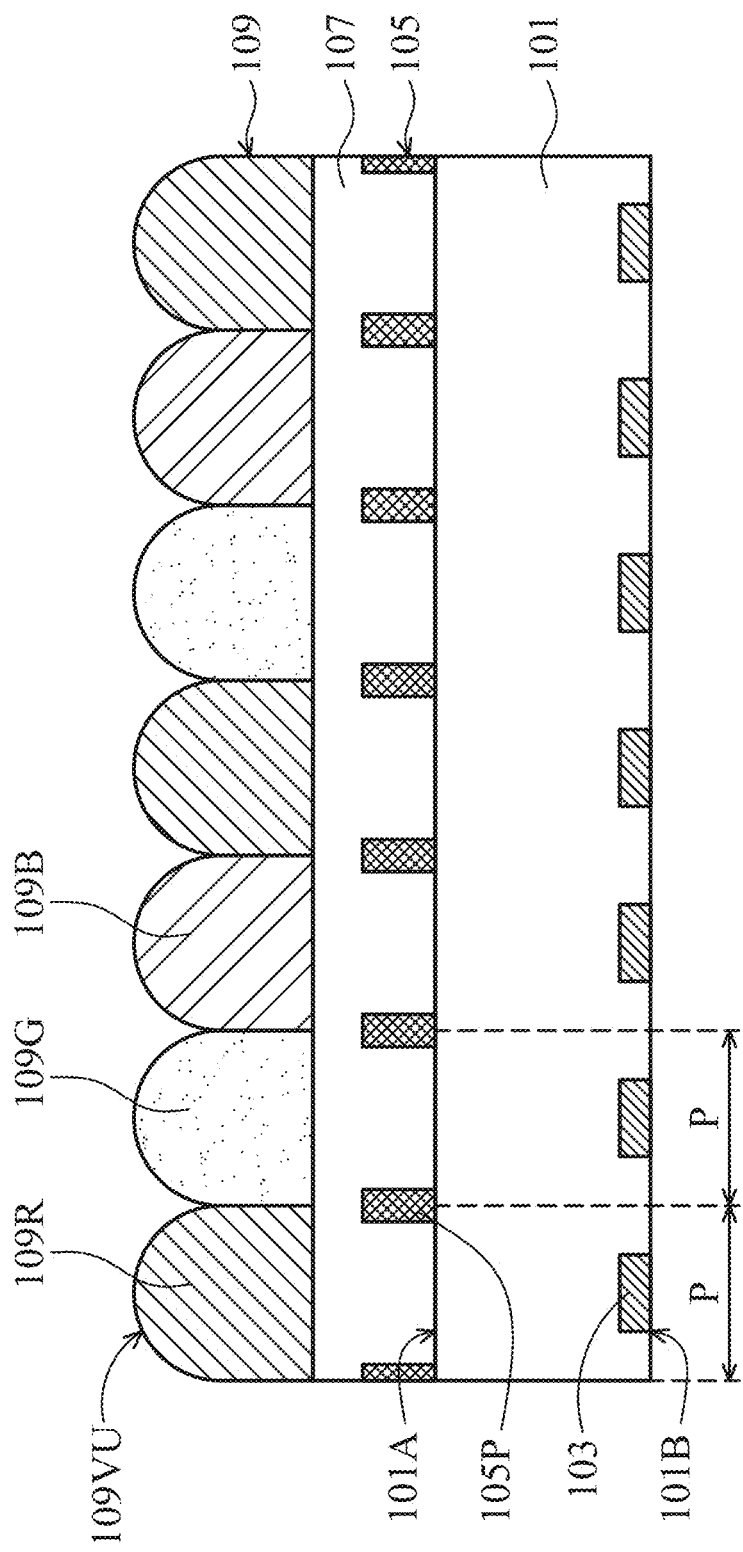

An etching back process 122 is performed on the color filter layer 108 by using the first hard mask 120. In some embodiments, an etching selectivity ratio of the first hard mask 120 to the color filter layer 108 is about 1:0.8. The etching back process 122 may be a dry etching. The dry etching process is performed by using a process gas of a fluorine (F) based gas, for example $CF_4$, $CHF_3$, etc. After the etching back process 122, an upper portion of the color filter layer 108 is etched and shaped to a convex profile surface. A lower portion of the color filter layer 108 is not etched and remained on the passivation layer 107. The first hard mask 120 is also removed. As shown in FIG. 2C, a first lens structure 109 formed of the color filter layer is completed. The first lens structure 109 has an upper convex profile surface 109VU for each of the color filter components 109R, 109G and 109B. The bottoms of adjacent zones of the first lens structure 109, i.e. the bottoms of the color filter components 109R, 109G and 109B, are connected together.

In some other embodiments, the first hard mask 120 has a thickness substantially equal to that of the color filter layer 108. Each element 121 of the first hard mask 120 has an area substantially equal to that of each color filter component 108R, 108G or 108B. The elements 121 of the first hard mask 120 are connected with each other. After the etching back process 122 is performed on the color filter layer 108 by using the first hard mask 120, both an upper portion and a lower portion of the color filter layer 108 are etched and shaped to form a convex profile for each color filter component 109R, 109G or 109B. A first lens structure 109 is completed. In the embodiments, the bottoms of adjacent zones of the first lens structure 109, i.e. the bottoms of the color filter components 109R, 109G and 109B, are separated from each other.

Figure 2D:
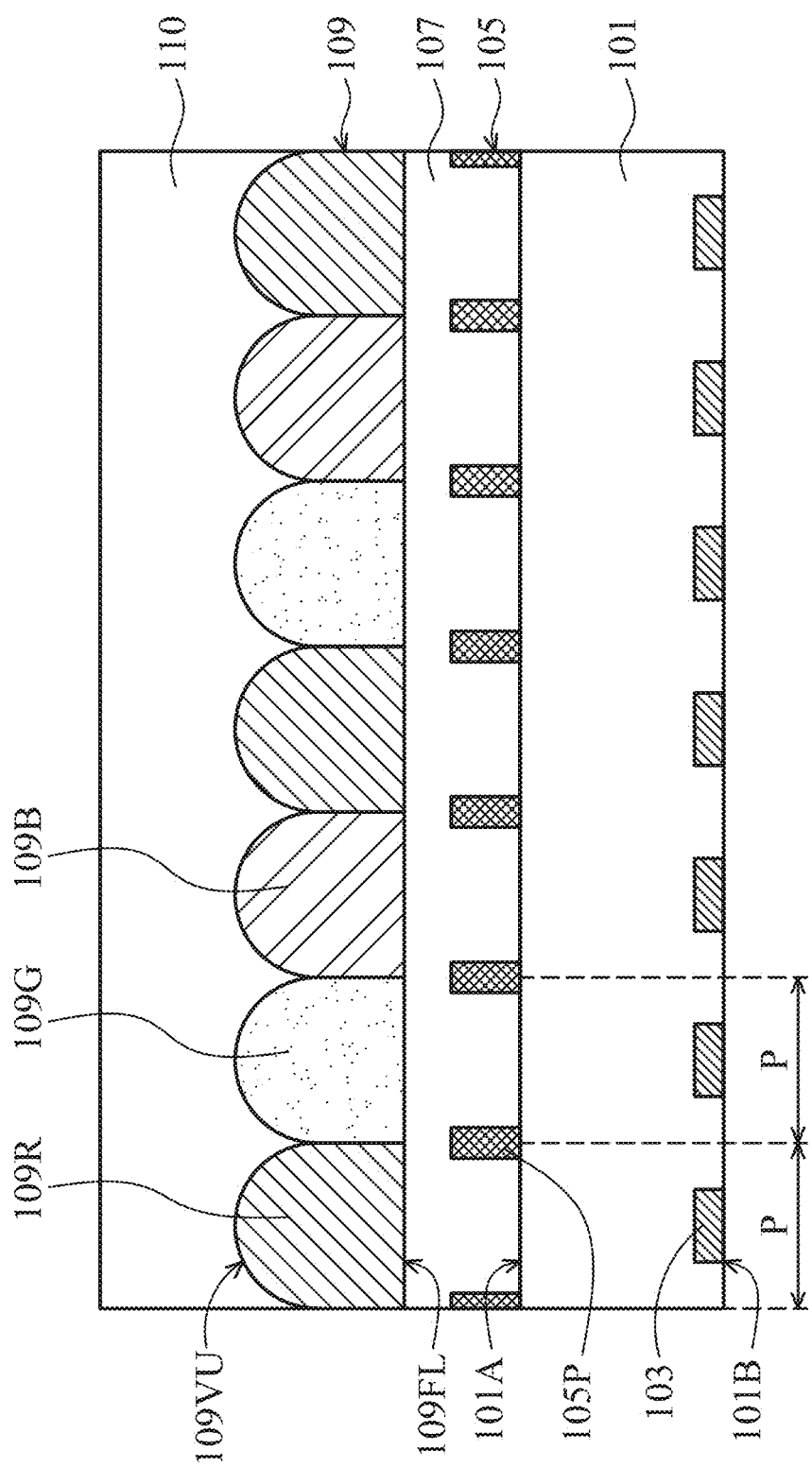
Figure 2E:
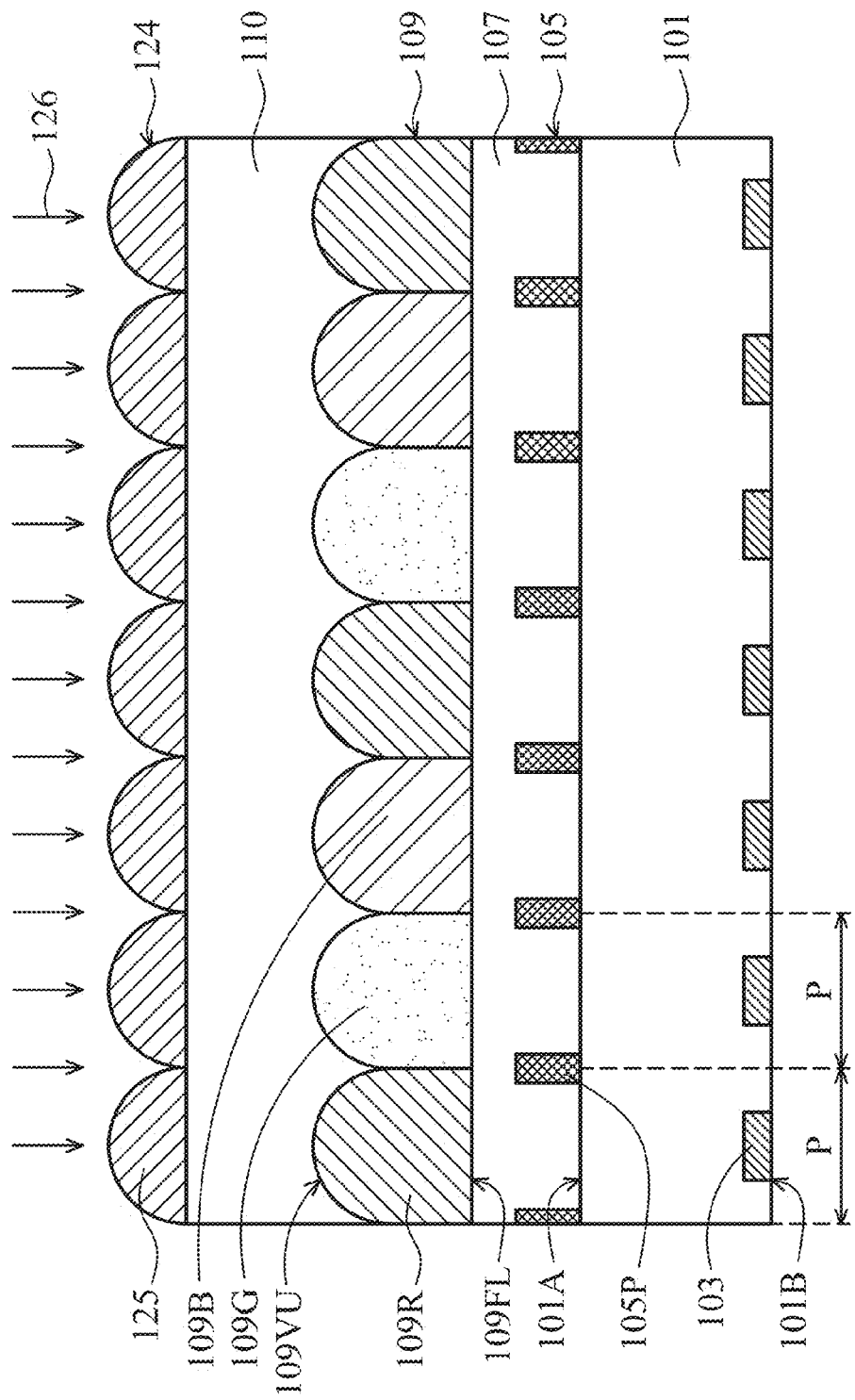

Referring to FIG. 2D, a micro-lens material layer 110 is coated on the first lens structure 109 and has a substantially flat surface. The micro-lens material layer 110 has a second refractive index $n_2$ lower than the first refractive index $n_1$ of the color filter layer 108. The material of the micro-lens material layer 110 includes a transparent organic material. Referring to FIG. 2E, a second hard mask 124 is formed on the micro-lens material layer 110. The second hard mask 124 has a plurality of elements 125. Each of the elements 125 has a convex profile and corresponds to one respective pixel P of the solid-state image sensor 102. In some embodiments, the material of the second hard mask 124 may be the same as that of the first hard mask 120. The second hard mask 120 is formed by a coating, photolithography and etching process.

In some embodiments, the second hard mask 124 has a thickness smaller than that of the microlens material layer 110. Each element 125 of the second hard mask 124 has an area substantially equal to that of each pixel P. The elements 125 of the second hard mask 124 are connected with each other. In some other embodiments, the second hard mask 124 has a thickness smaller than that of the microlens material layer 110. Each element 125 of the second hard mask 124 has an area smaller than that of each pixel P. The elements 125 of the second hard mask 124 are separated from each other.

An etching back process 126 is performed on the microlens material layer 110 by using the second hard mask 124. In some embodiments, an etching selectivity ratio of the second hard mask 124 to the microlens material layer 110 is about 1:0.8. The etching back process 126 may be a dry etching. After the etching back process 126, an upper portion of the microlens material layer 110 is etched and shaped to a convex profile for each microlens element 111ML of the second lens structure 111. A lower portion of the micro-lens material layer 110 is not etched and remained on the first lens structure 109. After the etching back process 126, the second hard mask 124 is also removed. The double-lens structure 100 of FIG. 1 is completed. As shown in FIG. 1, the second lens structure 111 includes a plurality of microlens elements 111ML formed of the microlens material layer 110 and has an upper convex profile surface 111VU and a lower convex profile surface 111VL for each of the microlens elements 111ML. In the embodiments, the bottoms of adjacent zones of the second lens structure 111, i.e. the bottoms of the microlens elements 111ML, are connected together.

In the embodiments, curvatures of the upper convex profile surface 111VU of the second lens structure 111 and the upper convex profile surface 109VU of the first lens structure 109 can be adjusted in accordance with a first refractive index $n_1$ of the color filter layer for forming the first lens structure 109 and a second refractive index $n_2$ of the micro-lens material layer for forming the second lens structure 111. Moreover, curvatures of the upper convex profile surface 111VU of the second lens structure 111 and the upper convex profile surface 109VU of the first lens structure 109 can be adjusted in accordance with the positions of the photoelectric conversion elements 103, a thickness of the first lens structure 109 and a thickness of the second lens structure 111.

Figure 3:
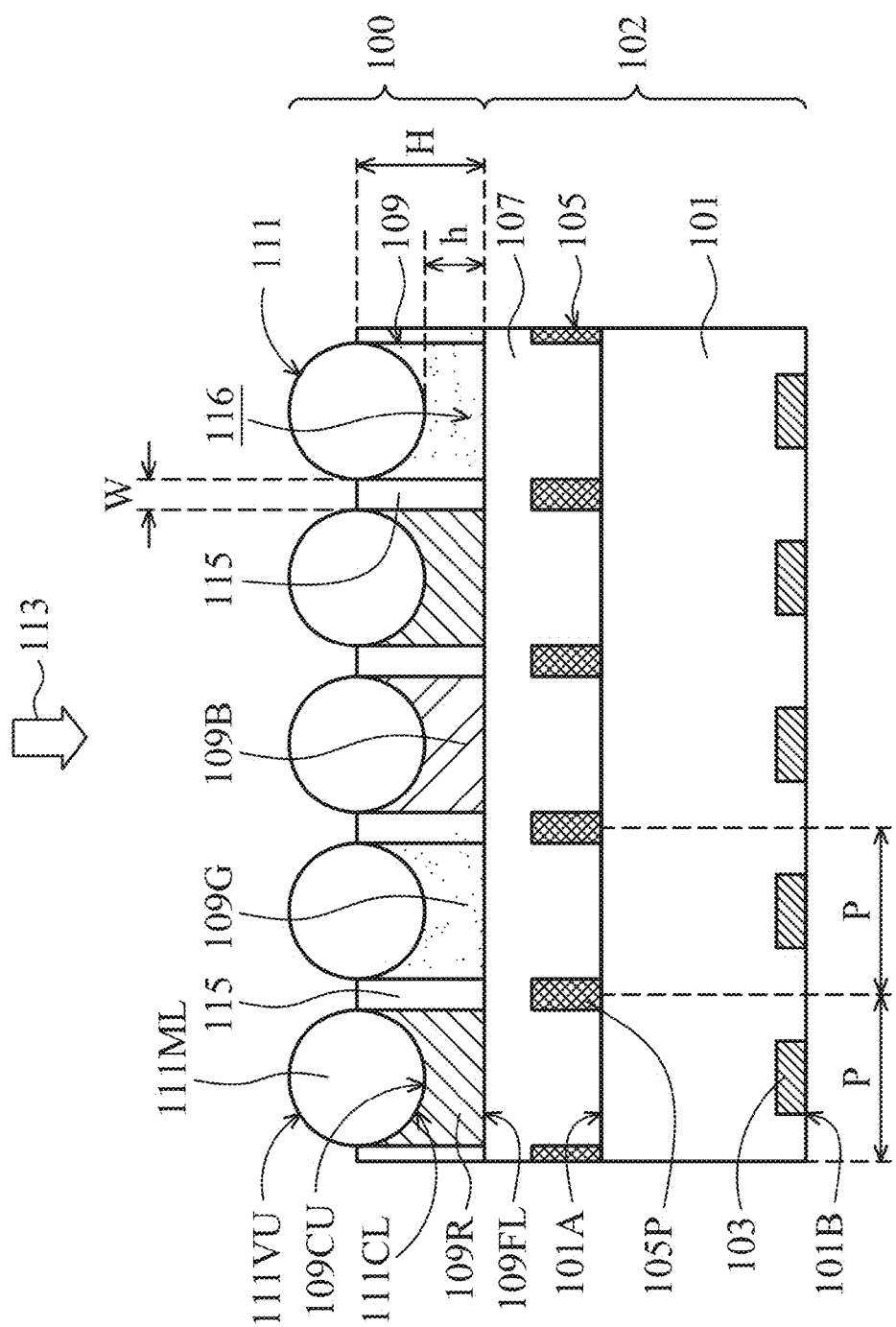
FIG. 3 shows a schematic cross section of a portion of a double-lens structure disposed over a solid-state image sensor according to some other embodiments.

Referring to FIG. 3, a cross section of a portion of a double-lens structure 100 disposed over a solid-state image sensor 102 according to some embodiments is shown. The solid-state image sensor 102 includes a substrate 101, a plurality of photoelectric conversion elements 103 formed on a back side surface 101B of the substrate 101, a wiring layer (not shown) formed on a front side surface 101A of the substrate 101, a light-shielding layer 105 and a passivation layer 107 formed over the substrate 101 as per the description above.

In some embodiments, a plurality of partitions 115 is formed on the passivation layer 107. Each of the partitions 115 is disposed between two adjacent pixels P of the solid-state image sensor 102. From a top view, the partitions 115 have a grid shape. Thus, the partitions 115 are also referred to as a grid-shaped partition. The grid-shaped partition 115 has a plurality of openings 116. A first lens structure 109 is formed of a color filter layer and disposed in the openings 116 of the grid-shaped partition 115. The grid-shaped partition 115 is disposed on the same plane with the color filter layer to separate the color filter layer into a plurality of zones. In some embodiments, the zones of the color filter layer include a plurality of color filter components, such as red (R) color filter components 109R, green (G) color filter components 109G and blue (B) color filter components 109B. Each of the color filter components 109R, 109G or 109B corresponds to one respective zone. In some other embodiments, the zones of the color filter layer further include white (W) color filter components. The color filter components 109R, 109G and 109B are separated from each other by the grid-shaped partition 115. Each of the color filter components 109R, 109G and 109B corresponds to one respective pixel P of the solid-state image sensor 102.

In some embodiments, the color filter layer for forming the first lens structure 109 has a first refractive index $n_1$. A second lens structure 111 is formed on the first lens structure 109. The second lens structure 111 includes a plurality of microlens elements 111ML. Each microlens element 111ML corresponds to one respective pixel P of the solid-state image sensor 102. The second lens structure 111 is formed of a micro-lens material layer having a second refractive index $n_2$. The first lens structure 109 and the second lens structure 111 constitute a microlens array of a double-lens structure used for the solid-state image sensor 102.

In the embodiments, the first refractive index $n_1$ of the color filter layer is lower than the second refractive index $n_2$ of the micro-lens material layer. The first lens structure 109 formed of the color filter layer has an upper concave profile surface 109CU for each of the color filter components 109R, 109G and 109B. The first lens structure 109 further has a lower flat surface 109FL opposite to the upper concave profile surface 109CU. The second lens structure 111 formed of the micro-lens material layer has an upper convex profile surface 111VU for each of the microlens elements 111ML. The second lens structure 111 further has a lower concave profile surface 111CL opposite to the upper convex profile surface 111VU. In addition, the lower concave profile surface 111CL of the second lens structure 111 is conformally formed on and in contact with the upper concave profile surface 109CU of the first lens structure 109.

An incident light 113 enters the second lens structure 111 from the upper convex profile surface 111VU and then passes through the first lens structure 109 to reach the photoelectric conversion elements 103. For both FSI and BSI imaging sensors, the incident light 113 is condensed by the second lens structure 111 and the first lens structure 109 of the double-lens structure 100 and then focused on the photoelectric conversion elements 103. Therefore, the sensitivities of the FSI and BSI imaging sensors are enhanced.

In the embodiments, the first refractive index $n_1$ of the first lens structure 109 is lower than the second refractive index $n_2$ of the second lens structure 111. In addition, the second lens structure 111 has an upper convex profile surface 111VU and the first lens structure 109 has an upper concave profile surface 109CU. According to the design of the profiles and the refractive indexes of the first lens structure 109 and the second lens structure 111, the condensing efficiency of the double-lens structure 100 is improved. The sensitivity of the solid-state image sensor 102 is thereby enhanced. Compared with a microlens array formed of a single-lens structure and disposed on a color filter layer having a flat surface, the condensing efficiency of the double-lens structure 100 of the embodiments is greatly enhanced.

In some embodiments, the grid-shaped partition 115 is formed of a transparent material having a third refractive index $n_3$. The third refractive index $n_3$ of the grid-shaped partition 115 is lower than the first refractive index n1 of the color filter layer for forming the first lens structure 109. The grid-shaped partition 115 has a height H greater than a height h of the first lens structure 109 at the bottom of the upper concave profile surface 109CU. In some embodiments, one pixel P of the solid-state image sensor 102 has a width of about 0.9 µm to about 1.4 µm. The grid-shaped partition 115 has a width W in a range from about 0.1 µm to about 0.3 µm. In some other embodiments, a width W and a height H of the grid-shaped partition 115 is changed to another range according to an area of one pixel P.

Figure 4A:
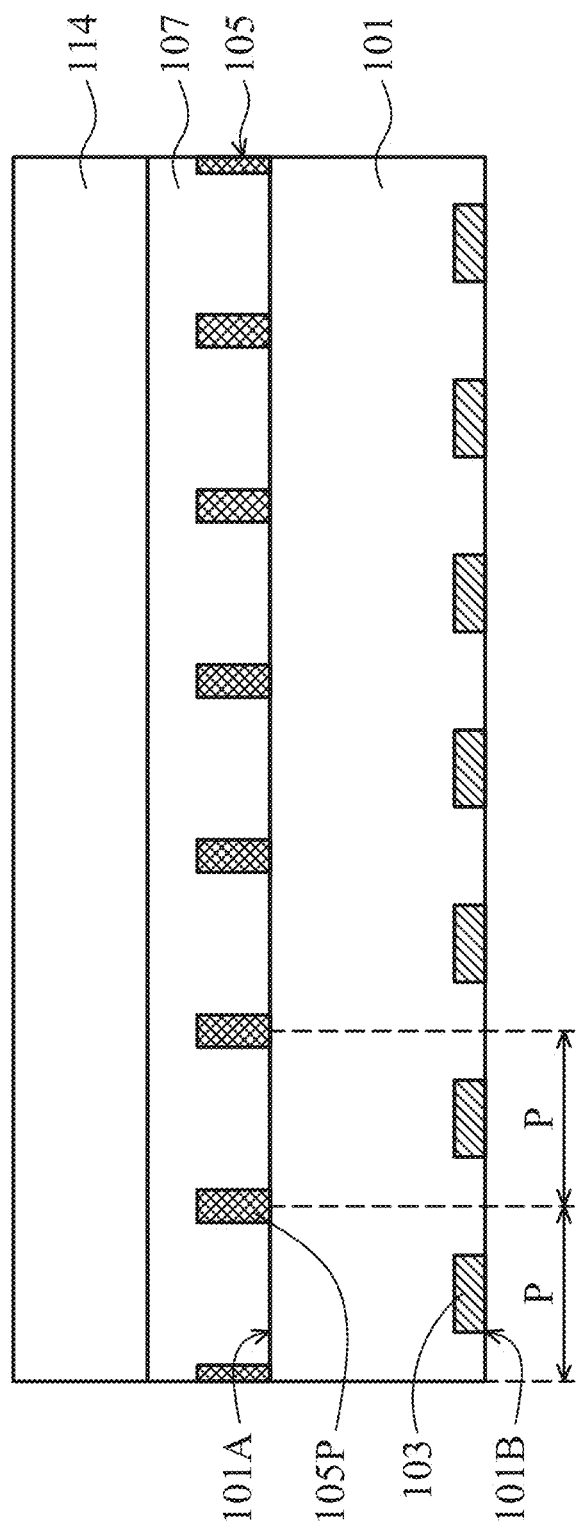
FIGS. 4A-4F show schematic partial cross sections of various stages of a process for fabricating the double-lens structure of FIG. 3 according to some embodiments.

FIGS. 4A-4F are partial cross sections of various stages of a process for fabricating the double-lens structure 100 of FIG. 3 in accordance with some embodiments. Referring to FIG. 4A, a solid-state image sensor 102 including a substrate 101, a plurality of photoelectric conversion elements 103, a wiring layer (not shown), a light-shielding layer 105 and a passivation layer 107 is provided as per the description above. A partition material layer 114 is coated on the passivation layer 107. The partition material layer 114 is a transparent and low refractive index material which has a third refractive index $n_3$ lower than the first refractive index $n_1$ of the color filter layer for forming the first lens structure 109. In some embodiments, the third refractive index $n_3$ is lower than 1.4 and the first refractive index $n_1$ is greater than 1.7.

Figure 4B:
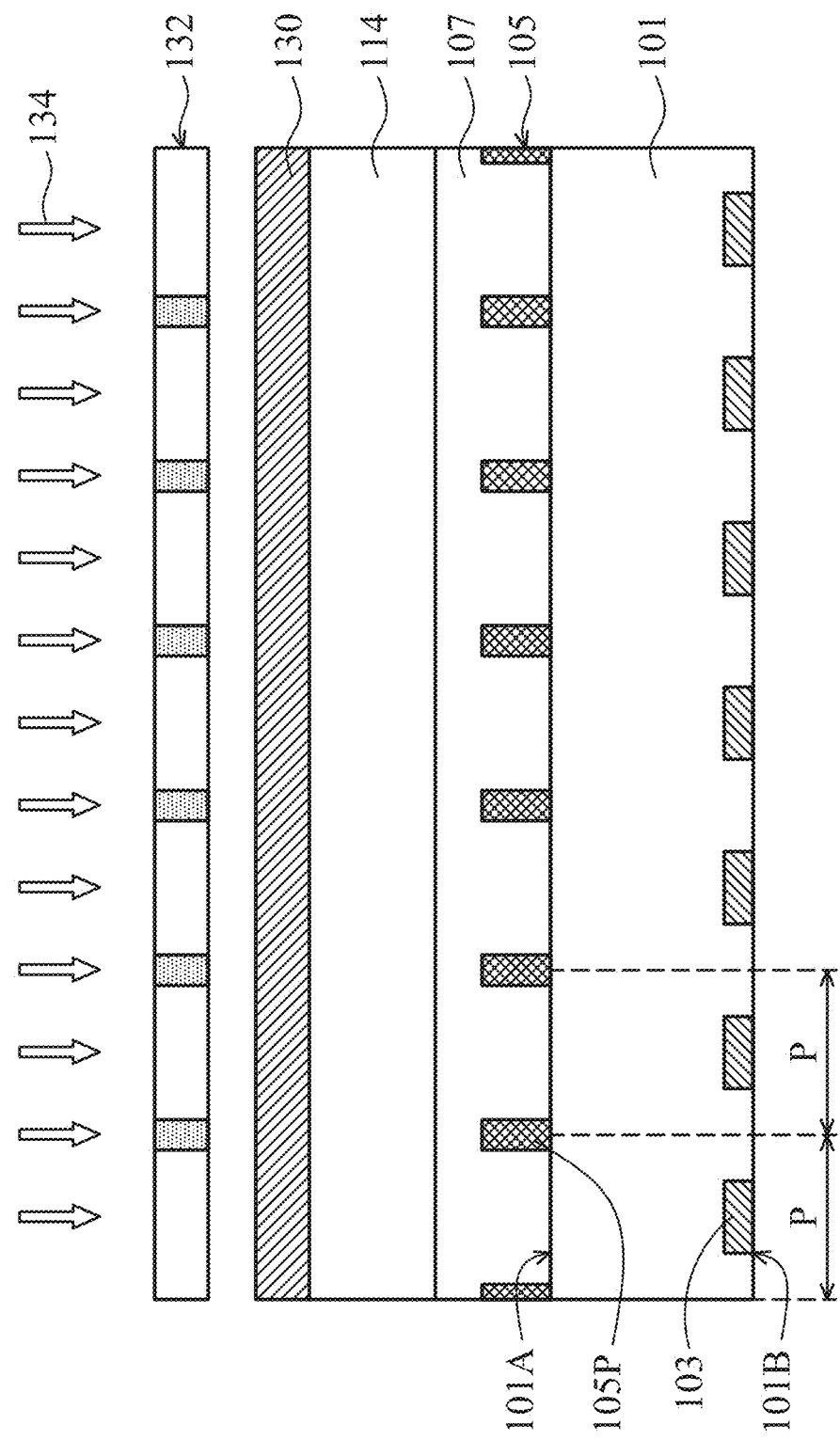
Figure 4C:
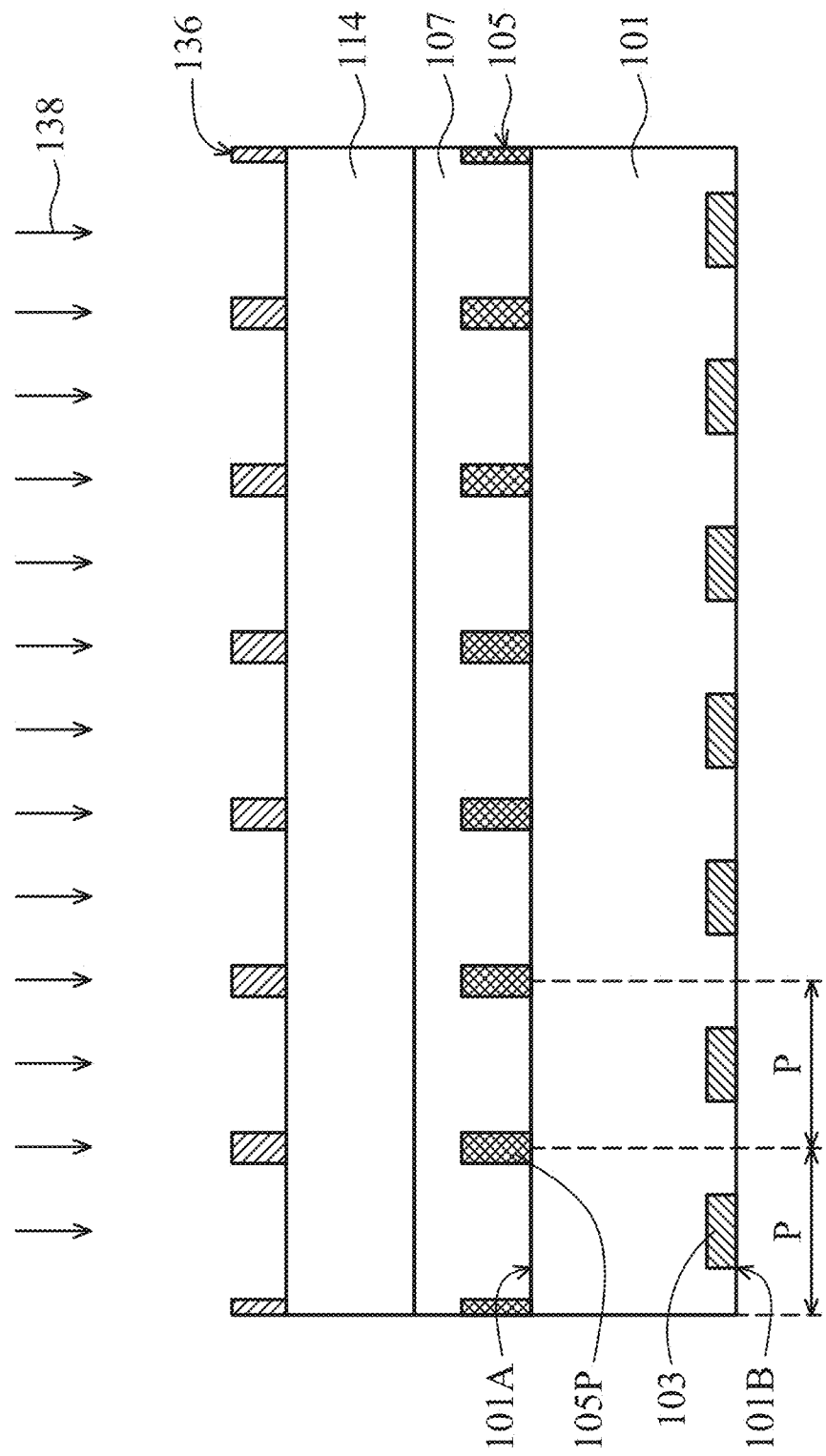

Referring to FIG. 4B, a hard mask material layer 130 is coated on the partition material layer 114. In some embodiments, the material of the hard mask material layer 130 is a photoresist. A photo mask 132 having a pattern corresponding to a pattern of a subsequently formed grid-shaped partition 115 is provided and disposed above the hard mask material layer 130. An exposure process 134 is performed on the hard mask material layer 130 by using the photo mask 132. A development process is performed on the exposed hard mask material layer 130 to form a hard mask 136 on the partition material layer 114 as shown in FIG. 4C.

Figure 4D:
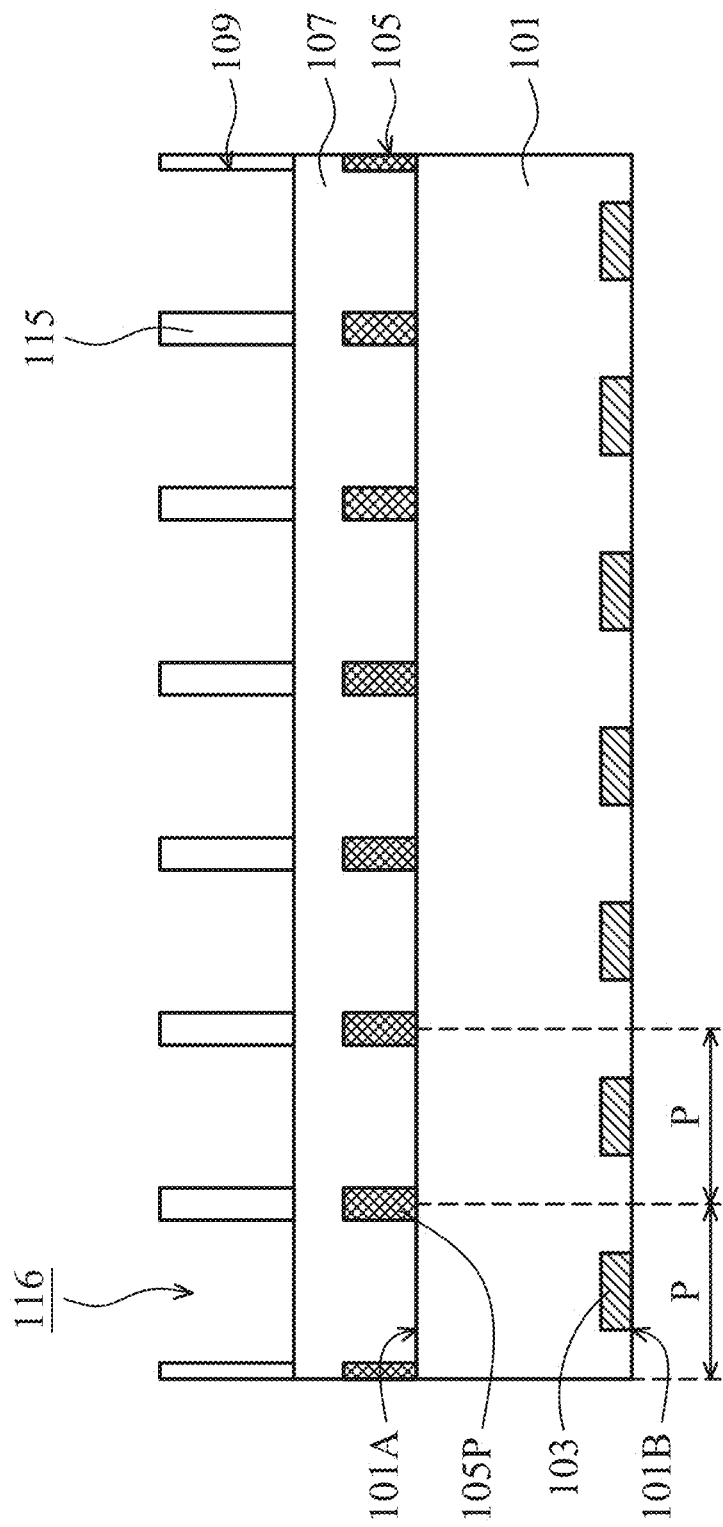

From a top view, the hard mask 136 has a grid shape corresponding to the pattern of grid-shaped partition 115. The hard mask 136 is also referred to as a grid-shaped hard mask. Referring to FIG. 4C, an etching process 138 is performed on the partition material layer 114 by using the grid-shaped hard mask 136. The etching process 138 may be a dry etching. After the etching process 138, a portion of the partition material layer 114 is removed to form the grid-shaped partition 115 on the passivation layer 107 as shown in FIG. 4D. The grid-shaped partition 115 has a plurality of openings 116 therein. In some embodiments, the grid-shaped partition 115 is disposed between adjacent pixels P of the solid-state image sensor 102. Each of the openings 116 of the grid-shaped partition 115 corresponds to one respective pixel P. The grid-shaped partition 115 may correspond to the light-shielding layer 105.

Figure 4E:
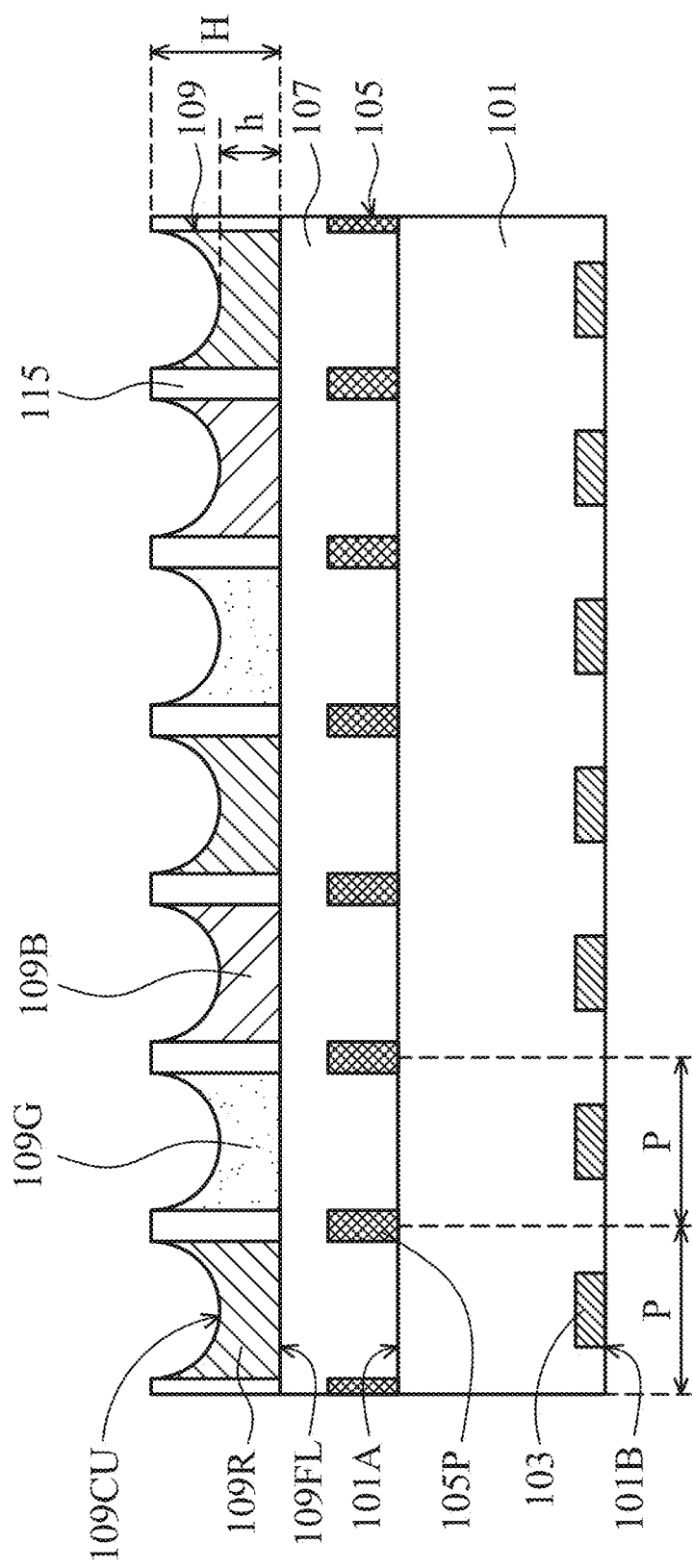

Referring to FIG. 4E, a color filter layer is coated on the passivation layer 107 and in the openings 116 of the grid-shaped partition 115. The color filter layer includes a plurality of color filter components, such as red (R) color filter components 109R, green (G) color filter components 109G and blue (B) color filter components 109B. The color filter components 109R, 109G and 109B are formed in sequence by a coating, exposure and development process at different steps. A portion of the color filter components 109R, 109G or 109B coated on the top of the grid-shaped partition 115 can be removed by a development process.

In the embodiments, the grid-shaped partition 115 has a height H greater than a coating thickness of each of the color filter components 109R, 109G and 109B of the color filter layer. Therefore, each of the color filter components 109R, 109G and 109B formed in the openings 116 of the grid-shaped partition 115 has an upper concave profile surface 109CU. In other words, a dish profile of each of the color filter components 109R, 109G and 109B is formed by a coating process. As shown in FIG. 4E, a first lens structure 109 formed of the color filter layer and having an upper concave profile surface 109CU for each of the color filter components 109R, 109G and 109B is completed.

Figure 4F:
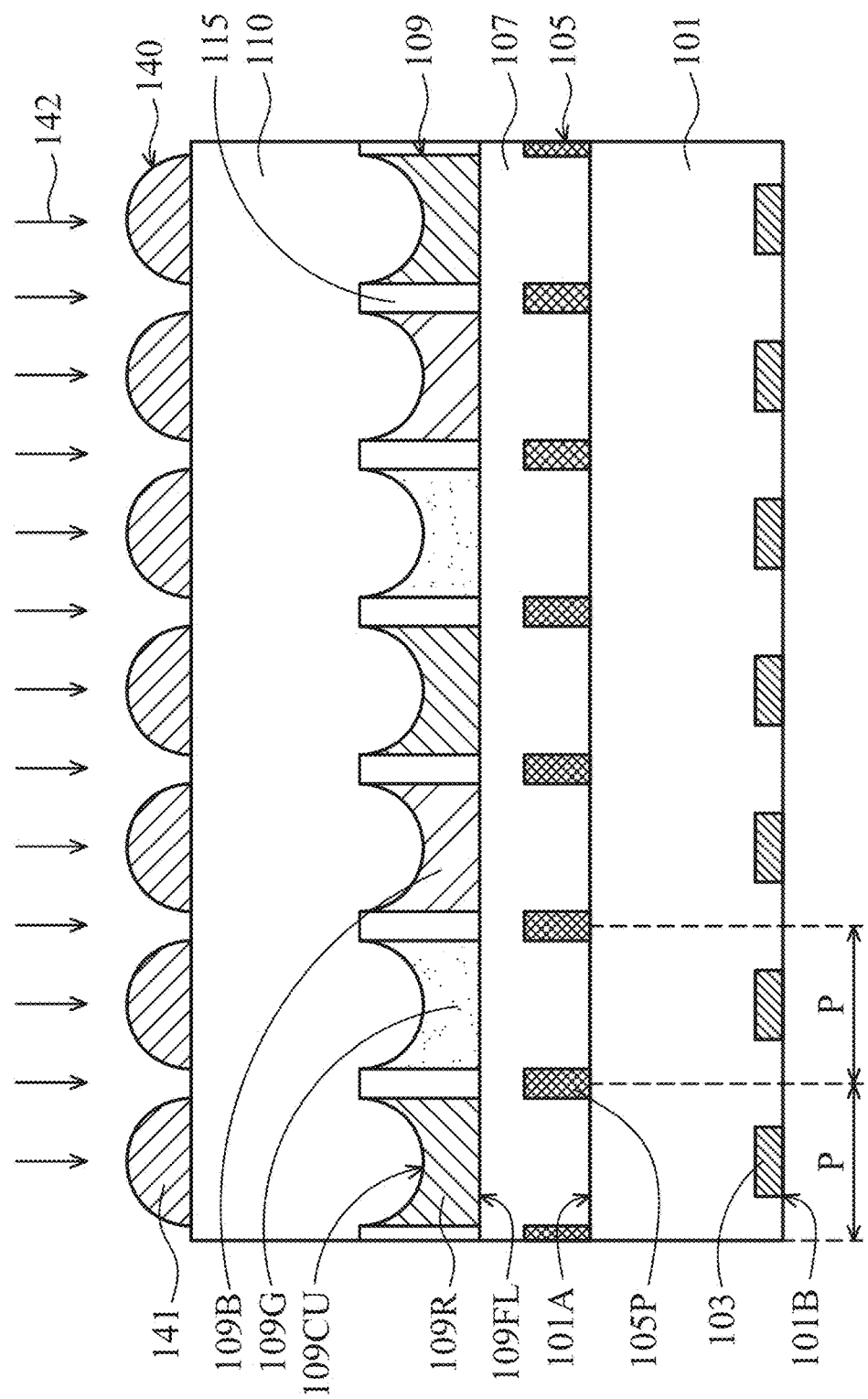

Referring to FIG. 4F, a microlens material layer 110 is coated over the first lens structure 109 and the grid-shaped partition 115. The microlens material layer 110 has a second refractive index $n_2$ greater than the first refractive index $n_1$ of the color filter layer for forming the first lens structure 109. The microlens material layer 110 has a substantially flat surface. A hard mask 140 is formed on the microlens material layer 110. The hard mask 140 has a plurality of elements 141. Each of the elements 141 has a convex profile and corresponds to one respective pixel P of the solid-state image sensor 102. In some embodiments, the material of the hard mask 140 includes a transparent organic material. The hard mask 140 is formed by a coating, photolithography and etching process.

In some embodiments, the hard mask 140 has a thickness smaller than that of the microlens material layer 110. Each element 141 of the hard mask 140 has an area smaller than that of each pixel P. The elements 141 of the hard mask 140 are separated from each other. In some other embodiments, the hard mask 140 has a thickness substantially equal to that of the microlens material layer 110. Each element 141 of the hard mask 140 has an area substantially equal to that of each pixel P. The elements 141 of the hard mask 140 are connected with each other.

An etching back process 142 is performed on the microlens material layer 110 by using the hard mask 140. In some embodiments, an etching selectivity ratio of the hard mask 140 to the microlens material layer 110 is about 1:0.8. The etching back process 142 may be a dry etching or a wet etching process. After the etching back process 142, an upper portion of the microlens material layer 110 is etched and shaped to form an upper convex profile surface 111VU for each microlens element 111ML of a second lens structure 111. A lower portion of the microlens material layer 110 is not etched and remained on the first lens structure 109. After the etching back process 142, the hard mask 140 is also removed. The second lens structure 111 including the microlens elements 111ML formed of the microlens material layer 110 is formed on the first lens structure 109. The double-lens structure 100 of FIG. 3 is completed.

In some embodiments, a portion of the microlens material layer 110 coated on the top of the grid-shaped partition 115 is removed by the etching back process 142. As a result, the microlens elements 111ML of the second lens structure 111 are separated from each other. In some other embodiments, after the etching back process 142, a portion of the microlens material layer 110 coated on the top of the grid-shaped partition 115 is remained. As a result, the microlens elements 111ML of the second lens structure 111 are connected with each other.

In the embodiments, curvatures of the upper convex profile surface 111VU of the second lens structure 111 and the upper concave profile surface 109CU of the first lens structure 109 can be adjusted in accordance with a first refractive index $n_1$ of the color filter layer for forming the first lens structure 109 and a second refractive index $n_2$ of the micro-lens material layer for forming the second lens structure 111. Moreover, curvatures of the upper convex profile surface 111VU of the second lens structure 111 and the upper concave profile surface 109CU of the first lens structure 109 can be adjusted in accordance with the positions of the photoelectric conversion elements 103, a thickness of the first lens structure 109 and a thickness of the second lens structure 111.

According to the embodiments of the disclosure, double-lens structures are provided to use as a microlens array for solid-state image sensors. The condensing efficiency of the microlens array is improved by the design of the double-lens structures. In the embodiments of the double-lens structures, surface profiles of the first lens structure and the second lens structure are modified in accordance with the refractive indexes of the materials for forming the first lens structure and the second lens structure. Moreover, methods for fabricating the double-lens structures with various surface profiles of the first lens structure and the second lens structure are also provided. The double-lens structures can accurately focus incident light on the photoelectric conversion elements. Therefore, the sensitivity of the solid-state image sensors is enhanced.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for fabricating a double-lens structure, comprising:
    forming a color filter layer having a first refractive index on a substrate;
    forming a first hard mask on the color filter layer, wherein the first hard mask has a convex profile;
    etching the color filter layer by using the first hard mask to form a first lens structure having a first convex profile surface;
    forming a micro-lens material layer having a second refractive index on the first lens structure;
    forming a second hard mask on the micro-lens material layer, wherein the second hard mask has a convex profile; and
    etching the micro-lens material layer by using the second hard mask to form a second lens structure having a second convex profile surface,
    wherein the first refractive index of the color filter layer is greater than the second refractive index of the micro-lens material layer, and wherein the first hard mask has a thickness smaller than a thickness of the color filter layer, after the step of etching the color filter layer by using the first hard mask to form the first lens structure, a lower portion of the color filter layer is not etched and bottoms of adjacent zones of the first lens structure are connected together.

2. The method as claimed in claim 1, wherein the second hard mask has a thickness smaller than a thickness of the micro-lens material layer, after the step of etching the micro-lens material layer by using the second hard mask to form the second lens structure, a lower portion of the micro-lens material layer is not etched and bottoms of adjacent zones of the second lens structure are connected together.

3. A method for fabricating a double-lens structure, comprising:
- forming a partition material layer having a first refractive index on a substrate;
- forming a first grid-shaped hard mask on the partition material layer;
- etching the partition material layer by using the first grid-shaped hard mask to form a grid-shaped partition having a plurality of openings;
- forming a color filter layer having a second refractive index in the openings of the grid-shaped partition to form a first lens structure having a first concave profile surface;
- coating a micro-lens material layer having a third refractive index on the first lens structure;
- forming a second hard mask on the micro-lens material layer, wherein the second hard mask has a convex profile; and
- etching the micro-lens material layer by using the second hard mask to form a second lens structure having a first convex profile surface,
- wherein the first refractive index of the partition material layer is lower than the second refractive index of the color filter layer, and the second refractive index of the color filter layer is lower than the third refractive index of the micro-lens material layer.

4. The method as claimed in claim 3, wherein the grid-shaped partition has a height greater than a thickness of the color filter layer at the bottom of the first concave profile surface.

5. The method as claimed in claim 3, wherein the step of forming the color filter layer in the openings of the grid-shaped partition comprises a coating process, an exposure process and a development process, a portion of the color filter layer coated on the top of the grid-shaped partition is removed after the development process.

6. The method as claimed in claim 5, wherein the color filter layer in the openings of the grid-shaped partition has a dished profile by the coating process.

7. The method as claimed in claim 3, wherein the second hard mask has a thickness equal to a thickness of the micro-lens material layer, after the step of etching the micro-lens material layer by using the second hard mask to form the second lens structure, a portion of the micro-lens material layer coated on the top of the grid-shaped partition is removed to expose the grid-shaped partition.

8. The method as claimed in claim 3, wherein the second hard mask has a thickness smaller than a thickness of the micro-lens material layer, after the step of etching the micro-lens material layer by using the second hard mask to form the second lens structure, a portion of the micro-lens material layer coated on the top of the grid-shaped partition is remained on the grid-shaped partition.

9. A method for fabricating a double-lens structure, comprising:
- forming a color filter layer having a first refractive index on a substrate;
- forming a first hard mask on the color filter layer, wherein the first hard mask has a convex profile;
- etching the color filter layer by using the first hard mask to form a first lens structure having a first convex profile surface;
- forming a micro-lens material layer having a second refractive index on the first lens structure;
- forming a second hard mask on the micro-lens material layer, wherein the second hard mask has a convex profile; and
- etching the micro-lens material layer by using the second hard mask to form a second lens structure having a second convex profile surface,
- wherein the first refractive index of the color filter layer is greater than the second refractive index of the micro-lens material layer, and wherein the first hard mask has a thickness equal to a thickness of the color filter layer, after the step of etching the color filter layer by using the first hard mask to form the first lens structure, a lower portion of the color filter layer is etched and bottoms of adjacent zones of the first lens structure are separated from each other.

* * * * *